United States Patent [19]
Walker

[11] Patent Number: 5,896,695
[45] Date of Patent: Apr. 27, 1999

[54] DEVICE FOR CONTROLLING CRAWLING OR FLYING INSECTS

[76] Inventor: Robert T. Walker, 7155 Santa Monica Blvd., Los Angeles, Calif. 90046

[21] Appl. No.: 08/672,986

[22] Filed: Jul. 1, 1996

[51] Int. Cl.⁶ .............................. A01M 1/14; A01M 1/04
[52] U.S. Cl. ................................ 43/107; 43/113; 43/114; 43/121
[58] Field of Search .................... 43/107, 113, 114, 43/121, 122; 220/339

[56] References Cited

U.S. PATENT DOCUMENTS

| | | | |
|---|---|---|---|
| 718,834 | 1/1903 | Godfrey | 43/107 |
| 1,231,877 | 7/1917 | Goodrum, Jr. | 43/113 |
| 2,264,875 | 12/1941 | Greuling | 43/114 |
| 4,069,615 | 1/1978 | Gilbert | 43/107 |
| 4,117,624 | 10/1978 | Phillips | 43/114 |
| 4,310,985 | 1/1982 | Foster et al. | 43/131 |
| 4,438,584 | 3/1984 | Baker et al. | 43/114 |
| 4,700,506 | 10/1987 | Williams | 43/113 |
| 4,918,856 | 4/1990 | Olive et al. | 43/113 |
| 4,979,329 | 12/1990 | Olive et al. | 43/113 |
| 5,040,327 | 8/1991 | Stack et al. | 43/131 |
| 5,044,112 | 9/1991 | Williams | 43/113 |
| 5,353,542 | 10/1994 | Vaudry | 43/107 |
| 5,513,465 | 5/1996 | Demarest et al. | 43/113 |

FOREIGN PATENT DOCUMENTS

| | | | |
|---|---|---|---|
| 367539 | 5/1990 | European Pat. Off. | 43/113 |
| 1591908 | 9/1990 | U.S.S.R. | 43/113 |
| 2210543 | 6/1989 | United Kingdom | 43/114 |

*Primary Examiner*—Michael J. Carone
*Assistant Examiner*—Darren Ark
*Attorney, Agent, or Firm*—Robert J. Schaap

[57] ABSTRACT

A device and a related method for entrapping both flying or crawling insects such as mosquitos, fleas and ants and the like and which is effective in attracting such insects to the device when they become mired in a tacky entrapping composition. The device is constructed so that it can be easily stored when not in use. The device comprises a box-like arrangement having two halves which are hingedly connected to one another and which can be opened to form a pair of trays and expose an insect entrapping composition in each tray. A highly reflective foil surrounds a perimeter of each half or tray and which may be provided with a luminescent paint to attract the insects and a highly reflective peripheral flange surrounding each tray acts as a mirror surrounding the luminescent paint thereby further enhancing the attraction. When contacting the entrapping composition, the insects are thereupon mired in the entrapping composition. In an alternative embodiment, each tray could be provided with an insect repelling composition to repel insects such as ants.

27 Claims, 2 Drawing Sheets

DEVICE FOR CONTROLLING CRAWLING OR FLYING INSECTS

BACKGROUND OF THE INVENTION

1. Field of the Invention

This invention relates in general to certain new and useful insect control devices, and more particularly, to a unique insect control device which can be used to either entrap insects or repel insects and which can be readily and easily opened or closed for use and for storage and which further precludes the evaporation of active ingredients when in the closed position.

2. Brief Description of Related Art

Pest infestation and particularly infestation from crawling and flying insects has long been a problem which has been repeatedly addressed by human beings. Nominally, these pests are only an irritation which can result in the ruining of, or diminishing the pleasure derived from many outdoor functions. In many cases they can become a serious human threat as a result of carrying and breeding various types of disease organisms. Accordingly, there has been a continued effort to combat and reduce infestation of crawling and flying pests, such as fleas, flies and the like. The term crawling as used herein shall also mean and encompass insects which hop or jump, such as fleas.

There have been numerous proposed and commercially available pest entrapping devices. Generally, all of these devices rely upon a container which may hold a sticky or tacky entrapping composition to trap and hold a flea or other insect once the insect has landed on the composition.

The pest entrapping devices which have been taught or which are otherwise commercially available generally rely upon some type of tray to hold the entrapping composition and are commonly referred to as "traps" such as "flea traps". In each case, the tray typically adopts the form of a shallow rectangular pan to rest upon a supporting surface and with an open top to enable an insect to land on an entrapping composition. One form of tray which has been taught is that in U.S. Pat. No. 4,700,506 to Williams.

A more complex type of insect tray and particularly a flea tray which relies upon a light for attracting fleas to a cage, where they are thereafter entrapped is taught in U.S. Pat. No. 5,231,790 to Dryden, et al. A further type of flea trap, which relies upon a generally open tray, is taught in U.S. Pat. No. 5,095,648 to Keenan. Another type of parasitic insect trap is further taught in U.S. Pat. No. 5,258,176 and which also relies upon an open tray.

There are numerous problems inherent with these commercially available and proposed devices for entrapping fleas and other pest insects. Usually, the tray devices are covered with a removable top when marketed. However, when the top is opened, insects will be allowed to land on and become mired in the exposed entrapping composition. There is generally no means to close the top after a period of use. As a simple example, a paper or paperboard top cover is provided and torn from the tray upon use. Frequently, the paper cannot be reapplied or otherwise disposed upon the tray after use.

In addition to the foregoing, there is no suitable means in any of the proposed or commercially available devices to fold the same or otherwise store the devices in a small compact unit when not in use.

There are also many insect repelling devices for repelling pests insects such as ants. The ants present a particular problem unlike fleas or mosquitos in that they will infest and multiply in a particular location. If that location is at or near a dwelling structure, they will then migrate into the dwelling structure. The insect repelling devices also rely upon a repellant composition, that is a composition to which the ants or other insects find an odor to be offensive.

These insect repelling devices, however, suffer from the same problems as do the entrapping devices. When the repelling device is opened, the active ingredients are then exposed to the air where they can quickly evaporate or otherwise loose their scent or repelling action. Heretofore, there has been generally no means to close the repelling device after initially opening same.

Frequently, when the commercially available and proposed entrapping and repelling trays are left opened, dust or other debris may collect in the composition. Where the composition is a sticky entrapping composition, the dust and other debris will substantially reduce the tacky effect and thereby greatly interfere with the intended operation of the device.

There are numerous other problems inherent with these commercially available and proposed entrapping compositions and devices and for that matter the repelling compositions. In addition to the above, pets, such as dogs and cats, may frequently be attracted to the composition and attempt to ingest the composition which can result in serious internal injury or illness to the pet animal.

Very frequently, when there is no need to use the repellent or entrapping composition, the tray or other container for this composition remains open where the composition is exposed to the atmosphere. Due to the fact that the user does not have the availability of a lid or other closure member, the active ingredient or ingredients in the composition evaporate thereby requiring either a recharging of the composition, or otherwise, the purchase of a new container with a fresh supply of the composition.

OBJECTS OF THE INVENTION

It is, therefore, one of the primary objects of the present invention to provide a pest control device which can be folded in a small compact unit for purposes of storage and transport and also for purposes of display and which can be opened to substantially increase an active surface area in use.

It is also an object of the present invention to provide a pest control device in the nature of an entrapping device which is effective in drawing insects to the device and entrapping the insects in a composition held by the device.

It is another object of the present invention to provide an insect control device which can be folded and stored when not in use and which can be easily and readily opened when used.

In addition to the foregoing, it is also an object of the present invention to provide an insect control device which can be closed and opened at will and which will preclude evaporation of active ingredients or a collection of dirt or debris while in the closed condition.

It is a further object of the present invention to provide an insect control device which is highly effective in reducing pest infestation in a certain area.

It is an additional object of the present invention to provide an insect control device which is relatively harmless to pet animals and human beings but which is, nevertheless, effective in either repelling or entrapping and destroying pest insects.

It is another salient object of the present invention to provide a method of entrapping insects without creating any substantial harm to pet animals or human beings and which also enables folding into a compact unit to avoid evaporation and dirt collection and permits easy storage when not in use and which can also be easily opened for use.

With the above and other objects in view, my invention resides in the novel features of form, construction, arrangement and combination of parts presently described and pointed out in the claims.

BRIEF SUMMARY OF THE INVENTION

This invention primarily relates to an insect entrapping device which may be constructed in the form of a casing or shell formed by a pair of shell halves or so-called "plates" which are hingedly connected to one another. In this way, the plates may be folded with one disposed on top of the other so that an insect entrapping composition carried by the plates, as hereinafter described, will not be exposed to the external atmosphere and which will also enable easy storage and transport. The plates may be opened along the hinged connection to expose the insect entrapping composition.

When the device is unfolded, the insect entrapping area is substantially doubled inasmuch as the two trays halves are substantially of equal size. In this way, the device becomes very space friendly in that it will only assume a small amount of shelf spaces for marketing and moreover, only assumes a small amount of shelf space for storage. In other words, the device will normally take one-half the amount of shelf or storage space a comparable device would require with the same amount of active ingredient surface area.

A plurality of ribs extend over the upper surface in each of the plates. For this purpose, each plate is provided with a recess for receiving the entrapping composition and the ribs extends over the upper surface of the entrapping composition to prevent pet animals from attempting to ingest the entrapping composition or otherwise stepping in the composition and tracking same in a dwelling structure.

In addition to the foregoing, the ribs are preferably formed of a bright color and may be provided with a luminescent paint. Further, a brightly colored foil rim may extend around the entrapping composition and which in combination with the brightly colored ribs becomes an attraction to insects, such as fleas and the like. Further, a highly reflective foil surface can be struck upwardly to provide a mirror effect which surrounds each plate and thereby amplifies the illuminating effect at each plate. This, in turn, increases the attraction to insects. In this way, the foil and the ribs or so-called "ribbons" are attractive to insects and will draw insects to the entrapping composition where they will effectively become entrapped in the entrapping composition.

The device of the present invention can be easily fabricated from moldable plastic material and where the two shells are each formed in a single molding operation. The entrapping composition can then be incorporated in the recess and the two shells connected to one another. Thus, the device can be made at a relatively low cost and is still highly effective in operation.

In an alternate embodiment of the invention, the insect entrapping composition could be replaced by an insect repellant composition. In this case, when the two plates are opened relative to one another, the repellant composition, as for example, eucalyptus oil, will repel the insects from an area in proximity to the device itself. However, when the device is not in use it can be closed to prevent the volatile components of the repellant from evaporating.

This invention has many other objects and purposes which will be made more clearly apparent from a consideration of the forms in which it may be embodied. One of these forms is more fully illustrated in the accompanying drawings and described in the following detailed description. However, it should be understood that this detailed description and the accompanying drawings are set forth for purposes of illustrating the general principles of the invention and are not to be taken in a limiting sense.

BRIEF DESCRIPTION OF THE DRAWINGS

Figure 1:
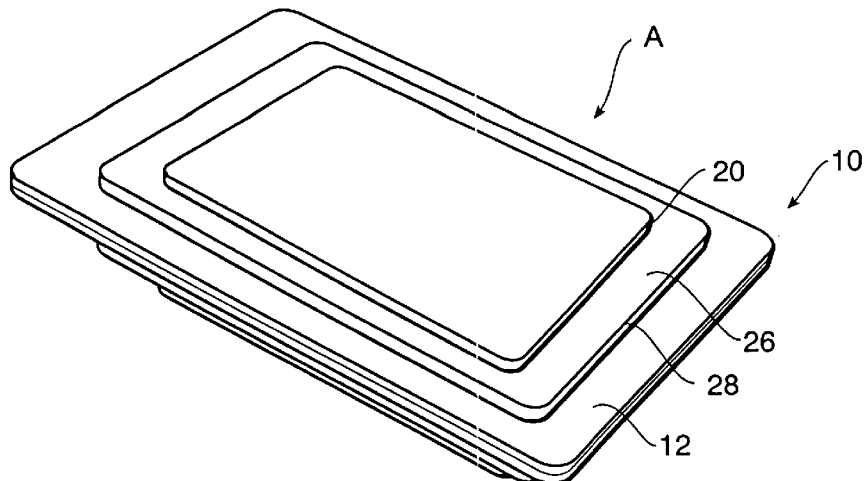
Figure 2:
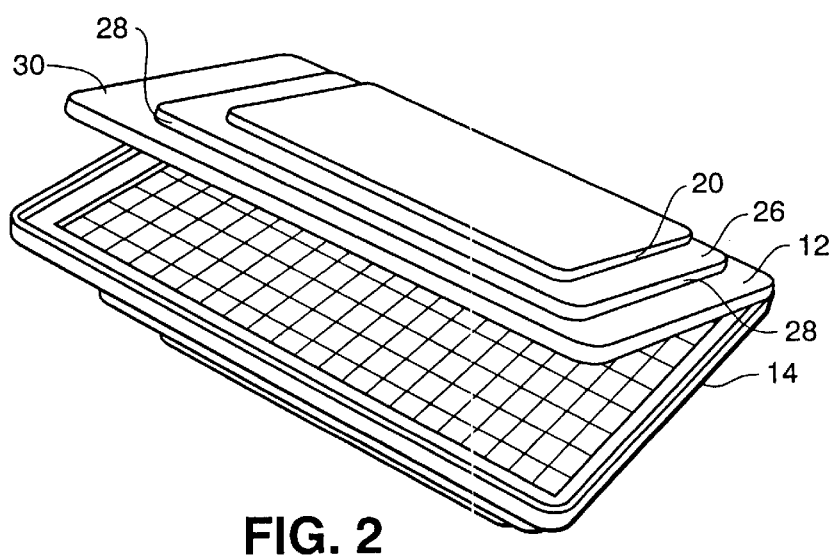
Figure 3:
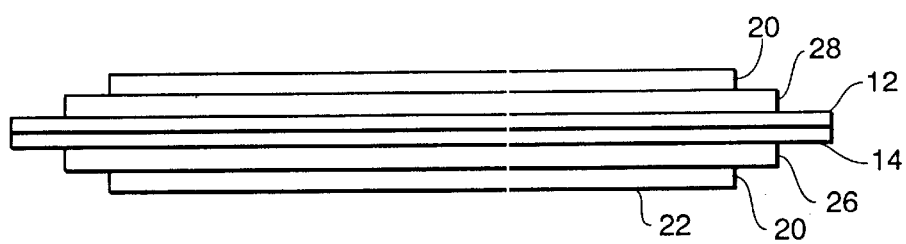
Figure 4:
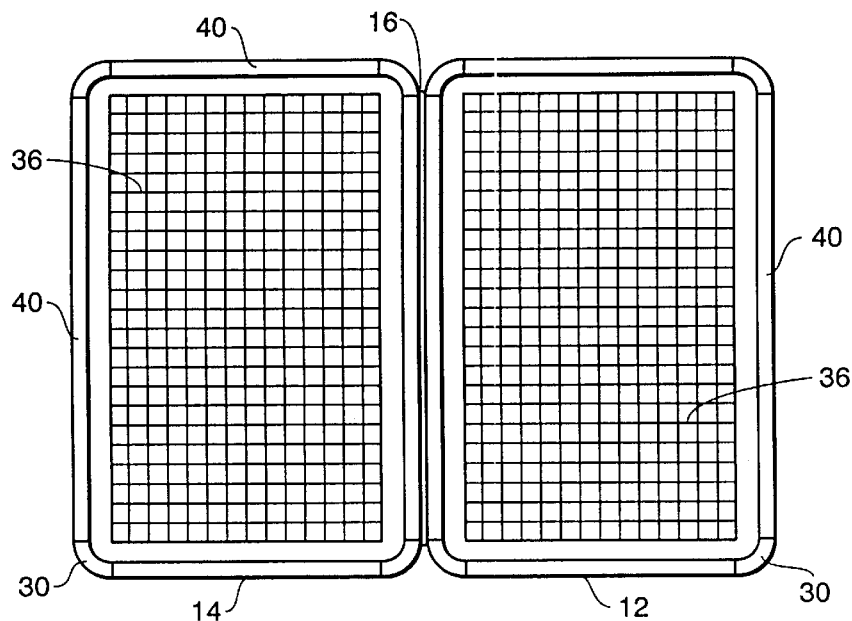
Figure 5:
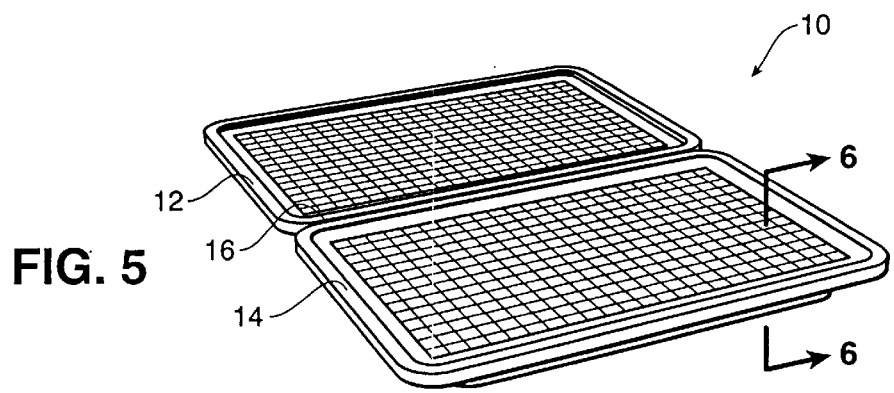
Figure 6:
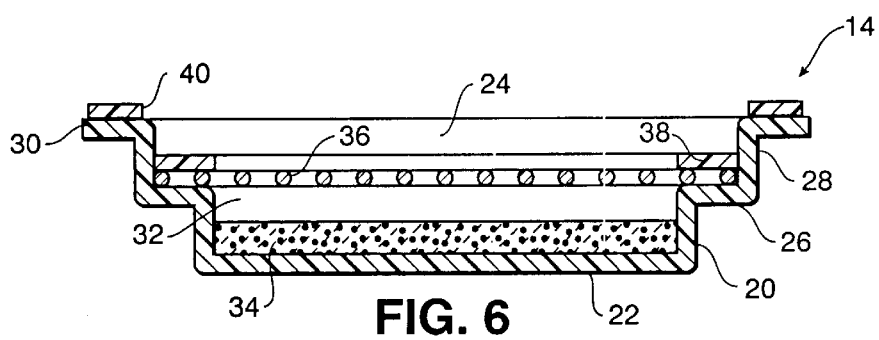

Having thus described the invention in general terms, reference will now be made to the accompanying drawings in which:

FIG. 1 is a perspective view of a device for entrapping or repelling insects constructed in accordance with and embodying the present invention;

FIG. 2 is a perspective view of the device of the present invention show a partially opened position;

FIG. 3 is a front elevational view of the device of FIG. 1 when in the closed position;

FIG. 4 is a top plan view of the device of the present invention when in a fully opened position;

FIG. 5 is a perspective view of the device of the invention in the fully opened position;

FIG. 6 is a sectional view taken along line 6—6 of FIG. 5; and

Figure 7:
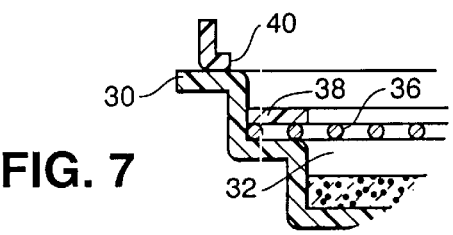

FIG. 7 is an enlarged vertical sectional view showing the bending of a light reflecting tab on the rim of one of the shells.

DETAILED DESCRIPTION OF PREFERRED EMBODIMENTS

Referring now in more detail and by reference characters to the drawings which illustrate a preferred embodiment of the invention, A designates a device for entrapping crawling or flying insects and which comprises an outer housing 10. By reference to FIGS. 2, 4 and 5 of the drawings, it can be seen that the housing 10 is comprised of a first shell 12, which may function as a upper shell, and a second shell 14 and which are both hingedly connected to one another at a hinge joint 16.

The first shell 12 is capable of being hingedly moved to a position where it is disposed over the second shell 14 and lies in abutting engagement therewith and in marginal registration, substantially as shown in FIG. 3 of the drawings when in the closed position. However, the first shell can be shifted with respect to the second shell 14 to a fully opened position, substantially as shown in FIG. 5 of the drawings. In this respect, the two shells 12 and 14, are effectively mirror images of one another.

The overall construction of each of the shells is substantially identical and thus, one of the shells, such as the lower shell 14 is more fully illustrated in FIG. 6 of the drawings. Since each of the shells 12 and 14 are substantially identical with respect to one another, the shell 12 will not be described in any further detail in terms of its outer construction. Moreover, like reference numerals used to describe the lower shell 14 are also applicable to the upper shell 12.

The shell 14 is comprised of an enclosing continuous side wall 20 connected by a flat wall such as a bottom wall 22 forming an interior compartment 24. The upper edge of the continuous wall 20 is provided with an outwardly struck generally horizontally disposed shoulder 26 which integrally merges into an upwardly struck retaining wall 28. At it's upper end, the wall 28 is provided with an outwardly flaring peripherally extending rim 30.

By reference to FIG. 4, it can be seen that one of the longitudinal edges of one of the rims 30 is connected to a longitudinal edge of the opposite of rim 30 by means of a hinge mechanism such as the hinge 16. In this case, the hinge 16 may adopt the form of a so-called "living hinge," that is a strip which is integral with each of the outwardly flaring rims 30. However, any conventional form of hinge means 16 may be employed for this purpose.

The interior compartment 24 is provided with a lower reservoir 32 which is designed to receive a semi-liquid viscous entrapping composition, designated as 34 in FIG. 6 of the drawings. In order to preclude animals from attempting to ingest the entrapping composition or the repellant, a foraminous member, such as a screen 36, is disposed on the shoulder 26 and precludes access to the entrapping composition without removing the screen. Moreover, if desired, a peripherally extending removable rectangularly shaped lip 38 can be disposed over the screen 36 in order to retentatively hold the screen on the shoulder 26. If desired, this lip 38 could be integrally formed with or otherwise rigidly secured to the wall 28 such that the screen 26 can be inserted into the peripherally extending groove formed by the shoulder 26 and the lip 38.

The device of the present invention is highly effective for use with fleas in that it is designed to draw fleas to the device as opposed to a pet animal or human being. For this purpose, it is, of course, desirable to attract the flea or other pests to the device. Thus, as shown in FIG. 4, a brightly colored luminous foil strip 40 is disposed on the upper surface of the rim 30 in each shell. This luminous foil is also reflective and is effective in attracting insects to the device.

If the device of the present invention is only to be used with an entrapping composition, then it would be desirable to attract fleas and other pests to the device itself. For this purpose, as shown in FIG. 4, a brightly luminous foil strip 40 or a reflecting member is disposed on the upwardly presented surface of the rim 30 of each shell. This luminous foil or reflective member 40 is highly effective in attracting insects to the device. At that point, they may attempt to investigate the entrapping composition and thereby cause the pests to become entrapped in the entrapping composition.

The reflecting member 40 may be secured to the outwardly flaring rim 30 only at one edge, substantially as shown in FIG. 7. In this way, the strip 40 can be folded upwardly so that it is vertically disposed and thereby causes a mirror effect of the luminescent paint surrounding the recess 32 and the entrapping composition 34. The various ribs along with the foil strip 40 are both brightly colored as indicted and may have a luminous paint on the surface thereof. Due to the fact that the upwardly struck foil strip 40 serves as a mirror, this enhances the illuminating effect and hence, the attraction of an insect to the device. When it is desired to close the unit for storage or transport, the strip 40 is merely folded downwardly, so that it lies in facewise engagement with the upper surface of the outwardly flaring rim 30.

The device of the present invention is highly effective in that it can be constructed of moldable plastic material such as polyethylene, polypropylene, polyvinylchloride, etc. Moreover, the device may be formed in a conventional plastic molding operation, such as injection molding, or the like. Since each of the two shells are identical, both may be made in the same mold and thereafter connected together by some hinge mechanism.

It should also be understood that the two shells forming part of the housing could be formed of other materials, including for that matter, wood, lightweight metals or the like. Further, they may also be constructed of reinforced plastic composite materials. In any event, due to the fact that they can be constructed of a low cost material in a low cost operation, the entire device is readily available at a low cost and highly effective in operation.

Due to the fact that the two shells fold over one another, the entire housing is capable of being easily stored without any fear of evaporation of the entrapping composition or any other active ingredient. Moreover, due to the fact that the two shells can be folded on one another, the device can easily be stored when not in use and requires little shelf space for marketing purposes. The entrapping composition is typically sufficiently viscous so that it will not pour from the tray. Moreover, it is preferably relatively non-toxic as for example, a vegetable wax. The device of the invention is also effective in that it does not require operation by electrical power.

The device of the present invention is also highly effective in that it assumes a small compact space when folded. This is highly advantageous, not only for purposes of storage, but for marketing, since it also assumes only a relatively small amount of shelf space. When the device is unfolded, the amount of entrapping surface area is doubled. The foraminous member, such as the screen 36, is also effective to preclude a pet animal from attempting to ingest the entrapping composition, which could otherwise cause the animal to become ill. Moreover, it precludes an animal from placing its foot in the entrapping composition and then tracking the composition into a dwelling structure.

The mere fact that the device of the invention uses a luminescent paint completely eliminates the need for any electrical operation. Heretofore, most flea entrapping devices required some type of electrical operation to attract the insects to the entrapping composition. The luminescent paint, along with the highly reflective strip, eliminates the need for any electrical operation. The reflective strip, amplifies and thereby greatly enhances the luminous paint or highly reflective metal foil strips and thereby amplifies and greatly enhances the pest attracting effects.

Although the device of the present invention has been designed to attract and trap fleas and other crawling or flying insects, it is also capable of being used as a repellant device. For this purpose, the entrapping composition would be eliminated and the reservoir in each of the trays would be filled with a repelling composition. Obviously, for this purpose, there would be no need to attract the insects and indeed, the device would function to repel insects. Thus, all insect attracting features would necessarily be eliminated for this purpose.

When used as a pest repelling device, the device is also effective for the same reasons as previously mentioned in that it assumes only a small amount of storage space when folded and can be opened to double the effective surface area. Moreover, and particularly with repellant compositions which are more highly volatile, the device of the invention can be closed when not in use to reduce the evaporation.

Thus, there has been illustrated and described a unique and novel device for entrapping fleas and which is highly effective and can be produced at a low cost. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by Letters Patent is:

1. A device for attracting and entrapping flying and crawling insects without need for electrical power, said device comprising:
   a) a plate having a recess therein with an entrapping composition in the recess;
   b) a rim section on said plate and surrounding said recess; and
   c) a non-electric brightly colored insect attracting element on said rim section and capable of presenting conditions such that it will provide an insect attraction, said insect attracting element is a luminous paint strip which absorbs sufficient light energy in substantial light and presents a glow for attracting insects when light conditions have been extinguished; and
   d) a reflective surface surrounding the insect attracting element to further create an insect attracting appearance and enhancing effects of the insect attracting element.

2. The device for attracting and entrapping flying and crawling insects of claim 1 further characterized in that said reflective surface lies flat on said rim section and is turned upwardly when said device is in use and is generally parallel to said rim section when not in use.

3. The device for attracting and entrapping flying and crawling insects of claim 1 further characterized in that a foraminous member extends over the entrapping composition to preclude contact by a pet animal.

4. The device for attracting and entrapping flying and crawling insects of claim 1 further characterized in that said device further comprises:
   a) a second plate capable of being disposed in juxtaposed relationship to said first plate and over said recess to close said recess to thereby reduce evaporation of the composition and foreign matter contamination;
   b) means connecting said plates together such that the second plate can be opened with respect to the first plate and disposed in juxtaposed relation to the first plate; and
   c) said second plate also having a recess with an entrapping composition therein to effectively double the surface area of the entrapping composition when the second plate is laid in side by side relationship to the first plate.

5. A device for attracting and entrapping flying and crawling insects without need for electrical power, said device comprising:
   a) a plate having a recess therein with an entrapping composition in the recess;
   b) a rim section on said plate and surrounding said recess;
   c) a luminous paint on said rim section which is capable of absorbing sufficient light energy in substantial light conditions such that it will present an insect attracting glow without need for an electrical light source in proximity to the rim section when the light conditions have been extinguished; and
   d) a vertically arranged reflective surface adjacent to and surrounding portions of the luminous paint to further create an insect attracting appearance and enhancing insect attracting effects of the luminous paint.

6. The device for attracting and entrapping flying and crawling insects of claim 5 further characterized in that said reflective surface lies flat on said rim section and is generally parallel to said rim section when not in use and is turned upwardly to be vertically arranged when said device is in use and is generally perpendicularly disposed to said rim section when in use.

7. The device for attracting and entrapping flying and crawling insects of claim 5 further characterized in that a foraminous member extends over the entrapping composition to preclude contact by a pet animal.

8. The device for attracting and entrapping flying and crawling insects of claim 7 further characterized in that said device further comprises:
   a) a second plate capable of being disposed in juxtaposed relationship to said first plate and over said recess to close said recess to thereby reduce evaporation of an entrapping composition therein and reduce foreign matter contamination; and
   b) means connecting said plates together such that the second plate can be opened with respect to the first plate and disposed in juxtaposed relation to the first plate.

9. The device for attracting and entrapping flying and crawling insects of claim 8 further characterized in that said second plate also has a recess with an entrapping composition therein to effectively double the surface area of the entrapping composition when the second plate is laid in side by side relationship to the first plate.

10. A device for attracting and entrapping flying and crawling insects without need for electrical power, said device comprising:
    a) a plate having a recess therein with an entrapping composition in the recess;
    b) a rim section on said plate and surrounding said recess;
    c) a luminous paint on said rim section and capable of absorbing sufficient light energy in substantial light conditions such that it will present an insect attracting glow without need for an electrical light source in proximity to the rim section when the light conditions have been extinguished;
    d) a reflective surface adjacent to and surrounding a portion of the luminous paint to further create an insect attracting appearance and enhancing the insect attracting effects of the luminous paint; and
    e) said reflective surface lying flat on and generally parallel to said rim section when said device is not in use, and said reflective surface being turned upwardly when said device is in use and is generally perpendicularly disposed to said rim section when in use.

11. The device for attracting and entrapping flying and crawling insects of claim 10 further characterized in that a foraminous member extends over the entrapping composition to preclude contact by a pet animal.

12. The device for attracting and entrapping flying and crawling insects of claim 11 further characterized in that said device further comprises:
    a) a second plate capable of being disposed in juxtaposed relationship to said first plate and over said recess to close said recess to thereby reduce evaporation of an entrapping composition therein and reduce foreign matter contamination; and
    b) means connecting said plates together such that the second plate can be opened with respect to the first plate and disposed in juxtaposed relation to the first plate.

13. The device for attracting and entrapping flying and crawling insects of claim 12 further characterized in that said second plate also has a recess with an entrapping composition therein to effectively double the surface area of the entrapping composition when the second plate is laid in side by side relationship to the first plate.

14. A device for attracting and entrapping flying and crawling insects without need for electrical power, said device comprising:

a) a plate having a recess therein with an entrapping composition in the recess;
b) a rim section on said plate and surrounding said recess; and
c) a brightly colored insect attracting element on said rim section and capable of presenting conditions such that it will function as an insect attraction, said insect attracting element being a luminous paint strip which absorbs sufficient light energy in substantial light and presents a glow for attracting insects when light conditions have been extinguished;
d) a reflective surface surrounding the insect attracting element to further create an insect attracting appearance and enhancing effects of the insect attracting element; and
e) said reflective surface lying flat on said rim section and being turned upwardly generally perpendicular to said rim section when said device is in use and being generally parallel to said rim section when not in use.

15. The device for attracting and entrapping flying and crawling insects of claim 14 further characterized in that a foraminous member extends over the entrapping composition to preclude contact by a pet animal.

16. The device for attracting and entrapping flying and crawling insects of claim 14 further characterized in that said device further comprises:
   a) a second plate capable of being disposed in juxtaposed relationship to said first plate and over said recess to close said recess to thereby reduce evaporation of the composition and foreign matter contamination;
   b) means connecting said plates together such that the second plate can be opened with respect to the first plate and disposed in juxtaposed relation to the first plate; and
   c) said second plate also having a recess with an entrapping composition therein to effectively double the surface area of the entrapping composition when the second plate is laid in side by side relationship to the first plate.

17. A device for entrapping and controlling crawling or flying pest insects and which precludes contact by a pet animal with an entrapping composition, said device comprising:
   a) a first plate;
   b) a base wall and surrounding vertically arranged side wall forming a composition receiving recess on said first plate to receive an entrapping composition;
   c) an outwardly extending peripheral lip projecting outwardly from said side wall and surrounding said recess and having a surface which is generally horizontally disposed;
   d) a foraminous member disposed over the entrapping composition and supported on said generally horizontally disposed surface of said lip to preclude access to the composition by a pet animal and to preclude a pet animal from stepping in the composition;
   e) an upwardly projecting peripherally extending wall and an outwardly extending peripheral rim extending upwardly and outwardly from said lip and forming a foraminous member receiving recess to receive the foraminous member; and
   f) insect attracting means associated with said rim to attract insects to the entrapping composition.

18. The device for entrapping insects of claim 17 further characterized in that a second plate is capable of being disposed in juxtaposed relationship to said first plate and over said composition receiving recess to close said composition receiving recess and reduce evaporation of the entrapping composition and reduce foreign matter contamination.

19. The device for entrapping insects of claim 18 further characterized in that means is provided for connecting said plates together such that the second plate can be opened with respect to the first plate and disposed in juxtaposed relation to the first plate.

20. The device for entrapping insects of claim 19 further characterized in that the means connecting the plates is a hinge means such that one plate is hingedly movable with respect to the other.

21. The device for entrapping insects of claim 17 further characterized in that said insect attracting means is a brightly colored strip which is located on one of said plates for attracting insects to the device.

22. The device for entrapping insects of claim 21 further characterized in that said brightly colored strip completely surrounds said composition receiving recess.

23. A device for controlling flying or crawling pest insects and which can be folded into a compact structure, said device comprising:
   a) a first plate;
   b) means forming a first recess on said first plate and having a pest insect controlling composition contained therein;
   c) a second plate capable of being disposed in juxtaposed relationship to said first plate and over said recess to close said recess and thereby reduce evaporation of the pest insect controlling composition and foreign matter contamination;
   d) hinge means connecting said plates together such that the second plate can be opened with respect to the first plate and disposed in juxtaposed relation to the first plate;
   e) means forming a second recess on said second plate and having a pest insect controlling composition contained therein;
   f) a foraminous member disposed over the composition in each of said recesses to preclude contact by a pet animal;
   g) a rim surrounding each of said recesses; and
   h) a bright permanently colored non-electric element on each of said rims to attract insects to the insect controlling composition.

24. The device for controlling pest insects of claim 23 further characterized in that said pest insect controlling composition is an entrapping composition or a repelling composition.

25. The device for controlling pest insects of claim 23 further characterized in that said second plate and said second recess with a pest controlling composition therein, each have sizes equivalent to the first plate and first recess to effectively double the surface area of the pest controlling composition when the second plate is laid in side by side relationship to the first plate.

26. The device for controlling pest insects of claim 23 further characterized in that the pest insect controlling composition is an entrapping composition, and each of said plates having an element located on the rims of said plates for attracting insects to the device, said elements being hingedly mounted on the plates for disposition in a plane parallel to the respective plate when not in use and generally perpendicular to the respective plate when in use.

27. The device for controlling pest insects of claim 26 further characterized in that said bright permanently colored non-electric element on each said rim is a luminous paint which absorbs light in a high light level condition and radiates light in a lower light level condition.

* * * * *